(12) United States Patent
Gao et al.

(10) Patent No.: US 11,906,814 B2
(45) Date of Patent: Feb. 20, 2024

(54) PRIME LENS MODULE, IN-VEHICLE CAMERA SYSTEM, AND CAMERA MODULE

(71) Applicant: JIANGXI LIANCHUANG ELECTRONIC CO., LTD., Nanchang (CN)

(72) Inventors: Bo Gao, Nanchang (CN); Weina Li, Nanchang (CN); Jianxin Huang, Nanchang (CN); Jian Han, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 755 days.

(21) Appl. No.: 17/038,065

(22) Filed: Sep. 30, 2020

(65) Prior Publication Data

US 2021/0011258 A1 Jan. 14, 2021

Related U.S. Application Data

(63) Continuation-in-part of application No. PCT/CN2020/086776, filed on Apr. 24, 2020.

(30) Foreign Application Priority Data

Apr. 28, 2019 (CN) .......................... 201910352535.8

(51) Int. Cl.
*G02B 9/00* (2006.01)
*G02B 9/64* (2006.01)
(Continued)

(52) U.S. Cl.
CPC ................ *G02B 9/64* (2013.01); *B60R 11/04* (2013.01); *G02B 13/0045* (2013.01)

(58) Field of Classification Search
CPC ...... G02B 9/64; G02B 13/0045; G02B 7/025; G02B 13/005; B60R 11/04; G03B 30/00
(Continued)

(56) References Cited

U.S. PATENT DOCUMENTS

2007/0087123 A1* 4/2007 Weber ............... B29C 66/81267
156/332
2015/0241663 A1* 8/2015 Gong ................... G02B 13/006
359/754
(Continued)

FOREIGN PATENT DOCUMENTS

CN 108469667 A 8/2018
CN 108490589 A 9/2018
(Continued)

OTHER PUBLICATIONS

WIPO, International Search Report for PCT application No. PCT/CN2020/086776, dated Jul. 22, 2020.
(Continued)

*Primary Examiner* — James C. Jones
*Assistant Examiner* — Henry Duong

(57) ABSTRACT

The present disclosure provides a prime lens module and an in-vehicle camera system. From an object side to an imaging side thereof, the prime lens module sequentially includes: a first lens with a negative focal power, a second lens with a negative focal power, a third lens with a positive focal power, a fourth lens with a positive focal power, a fifth lens with a positive focal power, a sixth lens with a negative focal power, and a seventh lens with a positive focal power. The first lens is a meniscus spherical lens. The second lens is a biconcave spherical lens. The third lens is a biconvex spherical lens and bonded to the second lens. The fourth lens is a biconvex spherical lens or a biconvex aspheric lens. The (Continued)

fifth lens is a biconvex spherical lens. The sixth lens is a biconcave spherical lens and bonded to the fifth lens.

18 Claims, 7 Drawing Sheets

(51) Int. Cl.
*B60R 11/04* (2006.01)
*G02B 13/00* (2006.01)

(58) Field of Classification Search
USPC .......................................................... 359/755
See application file for complete search history.

(56) References Cited

U.S. PATENT DOCUMENTS

2020/0096736 A1\* 3/2020 Chang ................ G02B 13/0035
2020/0241248 A1\* 7/2020 Chen .................. G02B 13/0045

FOREIGN PATENT DOCUMENTS

| CN | 109541780 A | 3/2019 |
| JP | 5265218 B2 | 8/2013 |

OTHER PUBLICATIONS

WIPO, Written opinion of the international search authority for PCT application No. PCT/CN2020/086776, dated Jul. 22, 2020.
SIPO, First Office Action for CN Application No. 201910352535.8, dated Aug. 28, 2020.

\* cited by examiner

PRIME LENS MODULE, IN-VEHICLE CAMERA SYSTEM, AND CAMERA MODULE

CROSS REFERENCE TO RELATED APPLICATION(S)

This application is a Continuation-in-part of PCT Application No. PCT/CN2020/086776, filed on Apr. 24, 2020, titled "PRIME LENS MODULE AND IN-VEHICLE CAMERA SYSTEM", which claims priority of CHINESE Application No. CN2019103525358, filed on Apr. 28, 2019, titled "PRIME LENS". The entirety of the above-mentioned applications is hereby incorporated by reference herein.

TECHNIQUE FIELD

The present disclosure relates to the field of optical lens technologies, and more particularly, to a prime lens module, an in-vehicle camera system, and a camera module.

BACKGROUND

Generally, a lens module with better image quality and higher resolution may include more pieces of lenses, because more pieces of lenses may help to correct the aberration and improve the resolution thereof. However, as the number of included lens increases, the cost of the lens module also rises. Therefore it is necessary to design a lens module with low cost.

SUMMARY

The present disclosure provides a prime lens module, an in-vehicle camera system, and a camera module to solve the above problem.

In a first aspect, the present disclosure provides a prime lens module. From an object side to an imaging side thereof, the prime lens module sequentially includes: a first lens with a negative focal power, a second lens with a negative focal power, a third lens with a positive focal power, a fourth lens with a positive focal power, a fifth lens with a positive focal power, a sixth lens with a negative focal power, and a seventh lens with a positive focal power. The first lens is a meniscus spherical lens with a concave surface facing the imaging side. The second lens is a biconcave spherical lens. The third lens is a biconvex spherical lens or a meniscus spherical lens. The fourth lens is a biconvex spherical lens or a biconvex aspheric lens. The fifth lens is a biconvex spherical lens. The sixth lens is a biconcave spherical lens. The seventh lens is selected from a group consisting of a biconvex aspheric lens, a biconvex spherical lens, and a meniscus aspheric lens. The second lens and the third lens are bonded together through optical glue; the fifth lens and the sixth lens are bonded through optical glue; one of the fourth lens and the seventh lens is a spherical lens while the other is an aspheric lens.

In some embodiments, the prime lens module satisfies the following expression:

$$0.7<|f_2/f_3|<0.9;$$

where $f_2$ represents a focal length of the second lens; and $f_3$ represents a focal length of the third lens.

In some embodiments, the prime lens module satisfies the following expression:

$$40<|V_5-V_6|<60;$$

where $V_5$ represents an Abbe number of the fifth lens; and $V_6$ represents an Abbe number of the sixth lens.

In some embodiments, the prime lens module satisfies the following expression:

$$0.6<f_4/f_7<0.8;$$

where $f_4$ represents a focal length of the fourth lens; and $f_7$ represents a focal length of the seventh lens.

In some embodiments, the prime lens module further includes a stop; wherein the stop is disposed between the fourth lens and the fifth lens or between the third lens and the fourth lens.

In some embodiments, the fourth lens is a biconvex spherical lens, and the seventh lens is a biconvex aspheric lens.

In some embodiments, the prime lens module satisfies the following expression:

$$6.5<T_L/(f*\tan\theta)<7.9;$$

Where $T_L$ represents an optical total length of the prime lens module; f represents a focal length of the prime lens module; and θ represents a half of FOV of the prime lens module.

In some embodiments, the shapes of each aspheric surface of the lenses in the prime lens module satisfies the following expression:

$$z = \frac{ch^2}{1+\sqrt{1-(1+k)c^2h^2}} + a_4h^4 + a_6h^6 + a_8h^8 + a_{10}h^{10} + a_{12}h^{12}$$

where z represents a vector height between a point on the surface and a vertex of the surface along an optical axis of the prime lens module; h represents a distance between the point on the surface and the optical axis; c represents a curvature of the vertex of the surface; k represents a conic coefficient; $a_4$ represents a fourth order surface coefficient; $a_6$ represents a sixth order surface coefficient; $a_8$ represents an eighth order surface coefficient; $a_{10}$ represents a tenth order surface coefficient; and $a_{12}$ represents a twelfth order surface coefficient.

In some embodiments, the first lens, the second lens, the third lens, the fourth lens, the fifth lens, the sixth lens, and the seventh lens are all made of glass materials.

In a second aspect, the present disclosure provides an in-vehicle camera system; the in-vehicle camera system includes the prime lens module, a processor, a memory, an image sensor. From an object side to an imaging side thereof, the prime lens module includes a first lens having a negative focal power and a concave imaging side surface, a second lens having a negative focal power and two concave spherical surfaces, a third lens having a positive focal power and two convex spherical surfaces, a fourth lens having a positive focal power, a fifth lens having a positive focal power and two convex spherical surfaces, a sixth lens having a negative focal power and two concave spherical surfaces; and a seventh lens having a positive focal power. The first lens is a meniscus spherical lens. The fourth lens is a biconvex spherical lens or a biconvex aspheric lens. The seventh lens is a biconvex aspheric lens or a biconvex spherical lens. The second lens and the third lens are bonded together through optical glue. The fifth lens and the sixth lens are bonded through optical glue. One of the fourth lens and the seventh lens is a spherical lens while the other is an aspheric lens.

In a third aspect, the present disclosure provides a camera module, the camera module includes a casing, a barrel connected to the casing, and a prime lens module disposed in the barrel. From an object side to an imaging side thereof, the prime lens module sequentially includes: a first lens having a negative focal power and a concave surface facing the imaging side, a second lens having a negative focal power and two concave spherical surfaces, a third lens having a positive focal power, a fourth lens having a positive focal power, a fifth lens having a positive focal power and two convex spherical surfaces, a sixth lens having a negative focal power and two concave spherical surfaces, and a seventh lens having a positive focal power. The third lens is a biconvex spherical lens or a meniscus spherical lens. The fourth lens is a biconvex spherical lens or a biconvex aspheric lens. The seventh lens is selected from a group consisting of a biconvex aspheric lens, a biconvex spherical lens, and a meniscus aspheric lens. The second lens and the third lens are bonded together through optical glue; the fifth lens and the sixth lens are bonded through optical glue; one of the fourth lens and the seventh lens is a spherical lens while the other is an aspheric lens. The prime lens module satisfies the following expression: $0.7<|f_2/f_3|<0.9$; where $f_2$ represents a focal length of the second lens; and $f_3$ represents a focal length of the third lens.

Compared with the prior art, in the prime lens module and the in-vehicle camera system including the prime lens module provided in the present disclosure, the second lens and the third lens are bonded together via optical glue, and the fifth lens and the sixth lens are bonded together via optical glue, which makes the prime lens module small in size, light in weight, and a processing accuracy of the prime lens module maintains at a low level. It is easy to assemble the prime lens module, and effectively reduces tolerance loss. A high-quality resolution is achieved, that is, an ability of resolving original details of a subject in the captured image is improved.

The advantages of the present disclosure will be given in part in the following description, and part of them will become apparent from the following description, or be learned through the practice of the present disclosure. The purpose and other advantages of the embodiments of the present disclosure can be realized and obtained through the structures in particular, pointed out in the written description, claims, and drawings.

BRIEF DESCRIPTION OF THE DRAWINGS

The above and/or additional aspects and advantages of the present disclosure will become apparent and easily understood from the description of the embodiments in conjunction with the following drawings, in which.

DETAILED DESCRIPTION OF PREFERRED EMBODIMENTS

Figure 1:
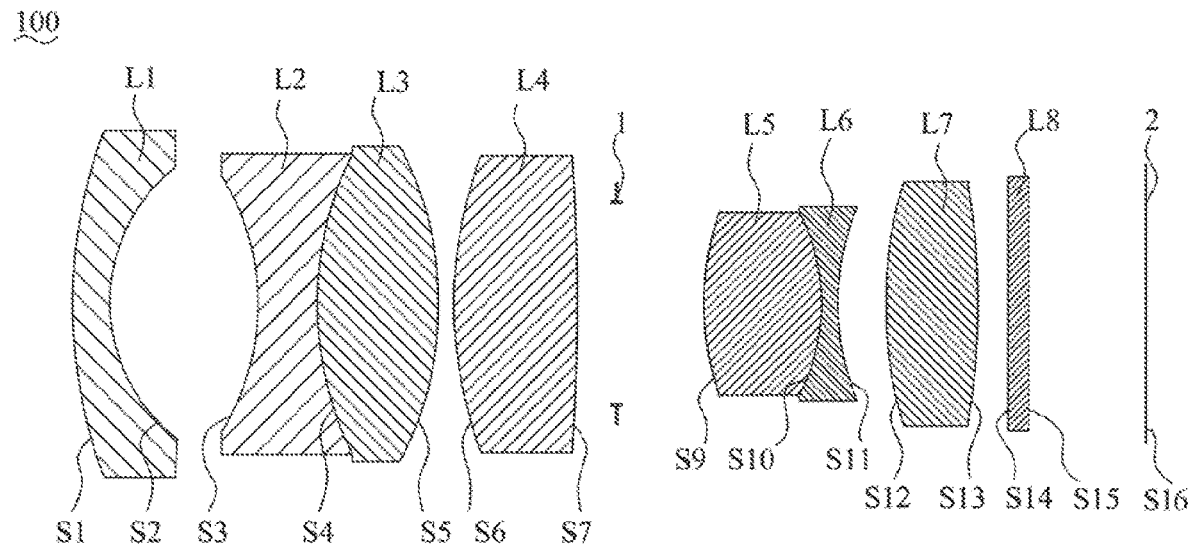
FIG. 1 illustrates a schematic cross-sectional view of the prime lens module, in accordance with a first embodiment of the present disclosure.

In order to facilitate the understanding of the present disclosure, the present disclosure will be described more fully hereinafter with reference to the accompanying drawings. Several embodiments of the disclosure are presented in the drawings. However, the disclosure may be embodied in many different forms and is not limited to the embodiments described herein. Rather, these embodiments are provided so that this disclosure will be thorough and comprehensive.

The prime lens module provided by the embodiments of this disclosure can be used as an in-vehicle lens and is suitable for an in-vehicle camera system. The prime lens module is applicable to the current high-definition chips. The prime lens module may achieve a high imaging quality in visible light environment and infrared light environment. A clear and bright monitor screen can be achieved in low illumination at night via the prime lens module.

With the development of the automotive industry towarding high-definition, the size of a chip is getting larger and larger, and the number of pixels are getting more and more. The existing chips in size of ⅓-inch or ¼-inch can no longer meet the requirements of market, and the resolution ratio of the chips needs to be improved. In a situation that needs continuous monitoring in day and night, a day and night suitable lens may be used. However, ordinary in-vehicle lenses are mainly designed for visible light situation during the day. In the evening and night, due to the increase in the proportion of infrared light in the environment, images captured by the ordinary in-vehicle lenses may get worse, and an imaging quality will be affected and cannot meet the requirements for capturing pictures when vehicles are driving at night.

Generally, a lens module with better image quality and higher resolution may include more pieces of lenses, because more pieces of lenses may help to correct the aberration and improve the resolution thereof. However, as the number of included lens increases, the cost of the lens module also rises. Therefore it is necessary to design a lens module with low cost.

Embodiment 1

As illustrated in FIG. 1, a prime lens module 100 is provided, in accordance with an embodiment of the present disclosure. The prime lens module 100, from an object side to an imaging side thereof, includes a first lens L1, a second lens L2, a third lens L3, a fourth lens L4, a fifth lens L5, a sixth lens L6, a seventh lens L7, and a filter L8.

The first lens L1 has a negative focal power and is a meniscus spherical lens with a concave surface facing the imaging side. An object side S1 of the first lens L1 is convex, an imaging side surface S2 of the first lens L1 is concave. The second lens L2 is a biconcave spherical lens with a negative focal power. An object side surface S3 and an imaging side surface of the second lens L2 are both concave. The third lens L3 is a biconvex spherical lens with a positive focal power. An object side surface S4 and an imaging side surface S5 of the third lens L3 are both convex. The fourth lens L4 is a biconvex spherical lens with a positive focal power. An object side surface S6 and an imaging side surface S7 of the fourth lens L4 are both convex surfaces. The fifth lens L5 is a biconvex spherical lens with a positive focal power. An object side surface S9 and an imaging side surface of the fifth lens L5 are both convex. The sixth lens L6 is a biconcave spherical lens with a negative focal power. An object side surface S10 and an imaging side surface S11 of the sixth lens L6 are both concave. The seventh lens L7 is a biconvex aspheric lens with a positive focal power. An object side surface S12 and an imaging side surface S13 of the seventh lens L7 are both convex. The second lens L2 and the third lens L3 are bonded together through optical glue. The fifth lens L5 and the sixth lens L6 are bonded together through optical glue. In particular, the imaging side surface of the second lens L2 is bonded to the object side surface of the third lens L3 via an optical glue. The imaging side surface of the fifth lens L5 is bonded to the object side surface of the sixth lens L6 via an optical glue. The filter L8 includes an object side surface S14 and an imaging side surface S15. The object side surface S14 and the imaging side surface S15 are both planar surface.

It should be noted that one of the fourth lens L4 and the seventh lens L7 is an aspheric lens while the other is a spherical lens. In other words, the fourth lens L4 is a biconvex spherical lens, while the seventh lens L7 is a biconvex aspheric lens; alternatively, the fourth lens L4 is a biconvex aspheric lens, while the seventh lens L7 is a biconvex spherical lens. In the illustrated embodiment of the present disclosure, the fourth lens L4 is a biconvex spherical lens, and the seventh lens L7 is a biconvex aspheric lens.

In addition, the prime lens module 100 may further include a stop 1. The stop 1 is disposed between the fourth lens L4 and the fifth lens L5. The stop 1 is a light-blocking paper defining a light-passing hole in the center thereof. The diameter of the light-passing hole of the stop 1 is smaller than that of a spacer ring of the prime lens module 100, so as to ensure that a light flux of the prime lens module 100 is determined by the diameter of the light-passing hole of the stop 1. The stop 1 is arranged between the fourth lens L4 and the fifth lens L5, which can enlarge an FOV of the prime lens module 100 and better match an incident angle of a chip. The light-shielding paper defining the light-passing hole in the center thereof is used as the stop 1, which can reduce requirements for a light-passing hole of a lens barrel of the prime lens module 100, and reduce difficulty of defining the light-passing hole of the lens barrel, an a productivity is improved, a production costs is reduced.

It can be understood that the imaging side surface 2 is positioned at the imaging side of the prime lens module 100.

To limit a total length of the system and ensure the system to achieve a high imaging quality, the prime lens module 100 satisfies the following expression:

$$6.5 < T_L/(f*\tan\theta) < 7.9, \quad (1)$$

wherein, $T_L$ represents an optical total length of the prime lens module 100, f represents a focal length of the prime lens module 100, and $\theta$ represents a half FOV of the prime lens module 100, that is, $\theta$ is equivalent to a half of the FOV of the prime lens module 100.

The total length of the prime lens module 100 is too large when a calculated value of $T_L/(f*\tan\theta)$ is greater than an upper limit. Alternatively, an image height will be in deficiency when a calculated value of $T_L/(f*\tan\theta)$ is greater than the upper limit and the total length of the prime lens module 100 is shortened. It is difficult to make a correction of a lens aberration because the focal length of each lens is too large, and a resolution ability of the prime lens module 100 is significantly reduced, when the calculated value of $T_L/(f*\tan\theta)$ is less than a lower limit. Therefore, the calculated value of $T_L/(f*\tan\theta)$ is limited to a value between 6.5 and 7.9, an appropriate image height is achieved, and the lens aberration is effectively corrected, and the resolution is good. In addition, an ideal image height may be determined by the calculated value of $f*\tan\theta$. Therefore, a reasonable calculated value of $f*\tan\theta$ can provide a suitable image height, so that an image size of the image is suitable for a chip in ½-inch size of 7.7 mm*4.4 mm*8.8 mm.

In order to provide a lens module with a suitable lens size and well correcting aberrations, the prime lens module 100 satisfies the following expressions:

$$0.7 < |f_2/f_3| < 0.9, \quad (2),$$

$$0.6 < f_4/f_7 < 0.8, \quad (3),$$

Wherein, $f_2$ represents a focal length of the second lens L2, $f_3$ represents a focal length of the second lens L3, $f_4$ represents a focal length of the fourth lens L4, and $f_7$ represents a focal length of the seventh lens L7. The above-mentioned expressions (2) and (3) reasonably limit a refractive power distribution of each lens, so that the prime lens module 100 may reduce an aberration and improve the refractive power while having a reasonable size.

When a calculated value of $|f_2/f_3|$ is greater than an upper limit, the refractive power of the second lens L2 and the third lens L3 is too strong after they are bonded together. In this situation, although the total length of the system can be reduced, the astigmatism, curvature of field, and distortion of the system are too large, thus it is difficult to correct. When the calculated value of $|f_2/f_3|$ is less than a lower limit, the refractive power of the second lens L2 and the third lens L3 is weaken after they are bonded together. In this situation, the above-mentioned various aberrations are relatively reduced, but the refractive power is reduced, which result in that the total length of the system is lengthened.

When a calculated value of $f_4/f_7$ is greater than an upper limit, the refractive power of the fourth lens L4 is too strong, and the stop 1 will be too close to the fourth lens L4. When the calculated value of $f_4/f_7$ is less than a lower limit, the refractive power of the fourth lens L4 is weaken, and the stop 1 will be too far away from the fourth lens L4.

In order to correct chromatic aberration, the prime lens module 100 also satisfies the following expression:

$$40 < |V_5 - V_6| < 60, \quad (4),$$

wherein, $V_5$ represents an Abbe number of the fifth lens L5, and $V_6$ represents an Abbe number of the sixth lens L6. The Abbe number is also called the dispersion coefficient, which is used to measure a degree of light dispersion of a transparent medium. An Abbe number represents an index of the dispersion ability of a transparent medium. Generally speaking, the greater a refractive index of the transparent medium, the more the dispersion, and the smaller the Abbe number. Conversely, the smaller the refractive index of the transparent medium, the less the dispersion, and the greater the Abbe number.

When a calculated value of $|V_5-V_6|$ is less than a lower limit, the correction of chromatic aberration is insufficient. It is difficult to select a material of the lenses when the calculated value of $|V_5-V_6|$ is greater than an upper limit.

In particular, the shape of aspheric surface of each aspheric lens satisfies the following expression:

$$z = \frac{ch^2}{1+\sqrt{1-(1+k)c^2h^2}} + a_4h^4 + a_6h^6 + a_8h^8 + a_{10}h^{10} + a_{12}h^{12}, \quad (5)$$

wherein, z represents a vector height between a point on the surface and a vertex of the surface along an optical axis of the prime lens module, h represents a distance between the point on the surface and the optical axis, c represents a curvature of the vertex of the surface, k represents a conic coefficient, $a_4$ represents a fourth order surface coefficient, $a_6$ represents a sixth order surface coefficient, $a_8$ represents an eighth order surface coefficient, $a_{10}$ represents a tenth order surface coefficient, and $a_{12}$ represents a twelfth order surface coefficient.

By using the above relational expressions to accurately design the aspheric surface size of each aspheric lens, the prime lens module 100 can greatly improve the clarity and sharpness of images by using the aberration correction function of the aspheric surface.

A curve of the aspheric surface is a hyperbola when k is less than −1. The curve of the aspheric surface is a parabola when k is equal to −1. The curve of the aspheric surface is an ellipse when k is between −1 and 0. The curve of the aspheric surface is circular when k is equal to 0. The curve of the aspheric surface is oblate when k is greater than 0.

In some embodiments, the first lens L1, the second lens, the third lens L3, the fourth lens L4, the fifth lens L5, the sixth lens L6, and the seventh lens L7 are all made of glass materials.

The prime lens module 100 provided by the embodiment of present disclosure is suitable for in-vehicle monitoring systems working with day and night. It achieves a high-definition imaging via a reasonable combination of glass lenses. It is fully applicable to the current high-definition chips. A high imaging quality is achieved in environment of visible light and infrared light. A clear and bright monitoring picture can be captured even in low illumination at night.

As illustrated in Table 1, relevant parameters of each lens of the prime lens module 100 in this embodiment are provided.

TABLE 1

| Surface No. | Code | Surface type | Curvature radius (mm) | Thickness (mm) | Refractive index | Abbe number |
|---|---|---|---|---|---|---|
| S1 | L1 | Spherical surface | 16.03 | 1.20 | 1.62 | 60.37 |
| S2 | | Spherical surface | 5.60 | 4.83 | | |
| S3 | L2 | Spherical surface | −7.97 | 1.97 | 1.72 | 29.51 |
| S4 | L3 | Spherical surface | 10.95 | 3.92 | 1.73 | 54.67 |
| S5 | | Spherical surface | −10.95 | 0.51 | | |
| S6 | L4 | Spherical surface | 13.45 | 4.00 | 1.90 | 31.32 |
| S7 | | Spherical surface | −77.40 | 1.32 | | |
| | Stop | Spherical surface | Infinity | 6.60 | | |
| S9 | L5 | Spherical surface | 9.15 | 3.81 | 1.50 | 81.61 |
| S10 | L6 | Spherical surface | −6.60 | 0.55 | 1.76 | 26.61 |
| S11 | | Spherical surface | 8.87 | 1.61 | | |
| S12 | L7 | Aspheric surface | 14.56 | 2.97 | 1.74 | 49.34 |
| S13 | | Aspheric surface | −16.99 | 0.97 | | |
| S14 | L8 | Spherical surface | Infinity | 0.70 | 1.52 | 64.21 |
| S15 | | Spherical surface | Infinity | 3.71 | | |
| S16 | Imaging side surface | Spherical surface | Infinity | 0.00 | | |

As illustrated in Table 2, the relevant parameters of the aspheric surface of the prime lens module 100 in this embodiment are provided.

TABLE 2

| Surface No. | k | $a_4$ | $a_6$ | $a_8$ | $a_{10}$ | $a_{12}$ |
|---|---|---|---|---|---|---|
| S12 | 7.95 | −0.00152 | 2.04E−05 | −1.8E−06 | 9.15E−08 | −1.6E−09 |
| S13 | −7.91 | 0.000047 | −2.1E−06 | 2.42E−06 | −1.6E−07 | 5.17E−09 |

Figure 2:
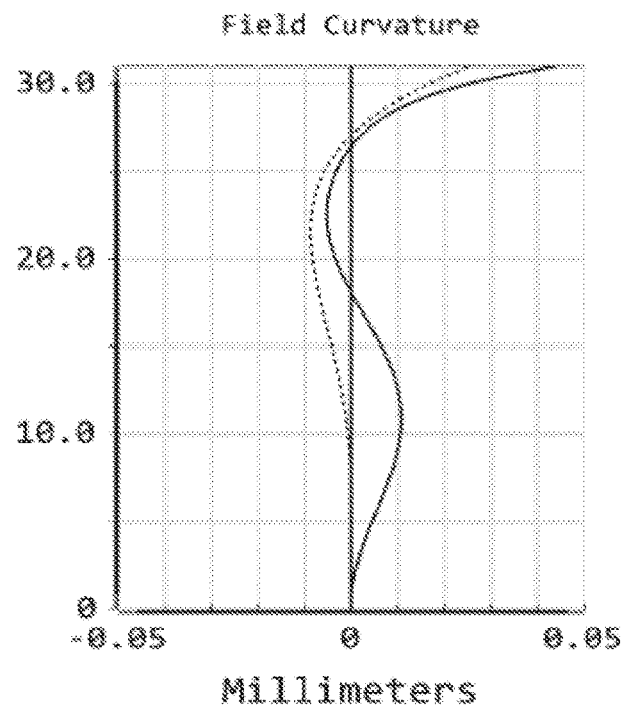
FIG. 2 illustrates a schematic diagram showing field curvature curves of the prime lens module, in accordance with the first embodiment of the present disclosure.
Figure 3:
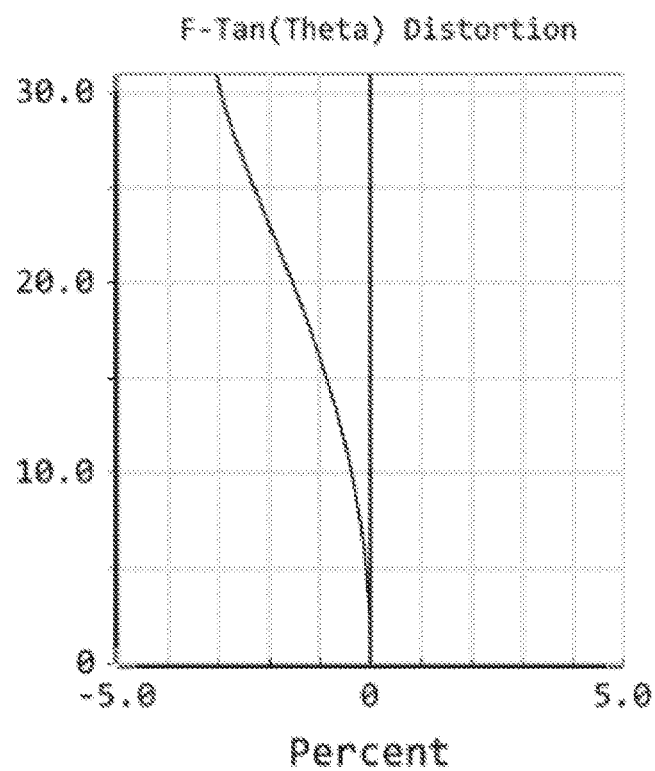
FIG. 3 illustrates a schematic diagram showing distortion curves of the prime lens module, in accordance with the first embodiment of the present disclosure.
Figure 4:
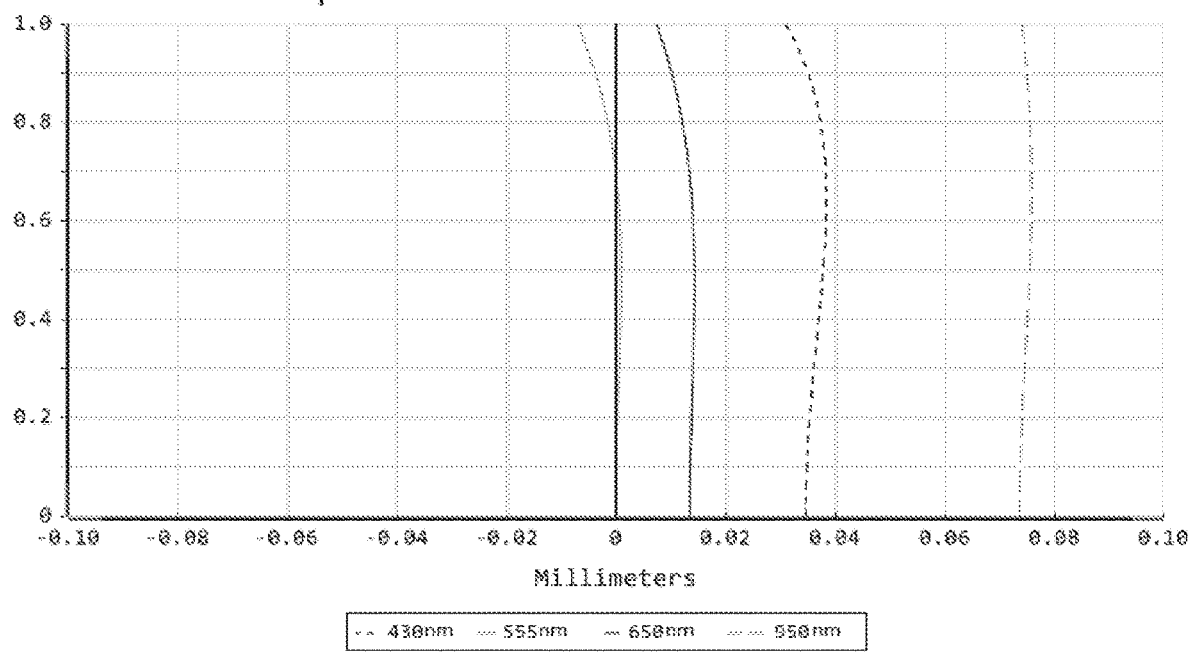
FIG. 4 illustrates a schematic diagram showing axial aberration curve of the prime lens module in the first embodiment of the present disclosure.

As illustrated in FIG. 2, FIG. 2 illustrates a schematic diagram showing field curvature curves of the prime lens module, in accordance with the illustrated embodiment. As illustrated in FIG. 3, FIG. 3 illustrates a schematic diagram showing distortion curves of the prime lens module, in accordance with the illustrated embodiment. As illustrated in FIG. 4, FIG. 4 illustrates a schematic diagram showing axial aberration curve of the prime lens module, in accordance with the illustrated embodiment. It can be seen from FIGS. 2 to 4 that the field curvature, the distortion, and the axial aberration of the prime lens module 100 are all well corrected.

Embodiment 2

Figure 5:
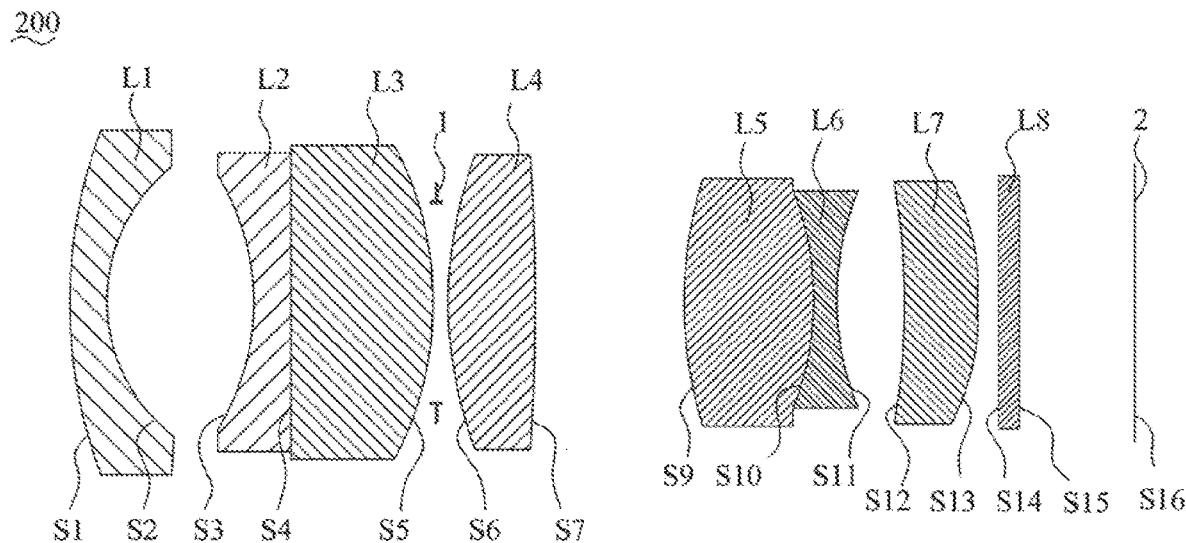
FIG. 5 illustrates a schematic cross-sectional view of the prime lens module, in accordance with a second embodiment of the present disclosure.

As illustrated in FIG. 5, a schematic cross-sectional structure diagram of the prime lens module 200 is illustrated, in accordance with a second embodiment of the present disclosure. The prime lens module 200 in this embodiment is substantially identical with the prime lens module 100 in the first embodiment, except for the following differences: the stop 1 of the prime lens module 200 in this embodiment is disposed between the third lens L3 and the fourth lens L4, instead of between the fourth lens L4 and fifth lens L5 of the prime lens module 100 in the first embodiment. Furthermore, the fourth lens L4 is a biconvex spherical lens, and the seventh lens L7 is a meniscus aspheric lens with a concave surface facing the object side.

The relevant parameters of each lens of the prime lens module 200 in this embodiment are different from the relevant parameters of each lens of the prime lens module 100 in the first embodiment.

As illustrated in Table 3, the relevant parameters of each lens of the prime lens module 200 in this embodiment are provided.

TABLE 3

| Surface No. | Code | Surface type | Curvature radius (mm) | Thickness (mm) | Refractive index | Abbe number |
|---|---|---|---|---|---|---|
| S1 | L1 | Spherical surface | 10.40 | 1.00 | 1.67 | 47.20 |
| S2 | | Spherical surface | 4.92 | 6.39 | | |
| S3 | L2 | Spherical surface | −6.31 | 0.80 | 1.69 | 31.16 |
| S4 | L3 | Spherical surface | 100.00 | 2.94 | 1.74 | 44.90 |
| S5 | | Spherical surface | −7.97 | 0.10 | | |
| | Stop | Spherical surface | Infinity | 0.10 | | |
| S6 | L4 | Spherical surface | 10.44 | 2.10 | 1.72 | 47.92 |
| S7 | | Spherical surface | −48.88 | 2.61 | | |
| S9 | L5 | Spherical surface | 10.34 | 4.00 | 1.50 | 81.61 |
| S10 | L6 | Spherical surface | −6.78 | 0.80 | 1.78 | 25.72 |
| S11 | | Spherical surface | 15.30 | 1.88 | | |
| S12 | L7 | Aspheric surface | −100.00 | 1.80 | 1.81 | 41.00 |
| S13 | | Aspheric surface | −12.57 | 1.00 | | |
| S14 | L8 | Spherical surface | Infinity | 0.70 | 1.52 | 64.21 |
| S15 | | Spherical surface | Infinity | 3.78 | | |
| S16 | Imaging side surface | Spherical surface | Infinity | 0.00 | | |

As illustrated in Table 4, the relevant parameters of the aspheric surface of the prime lens module 200 in this embodiment are provided.

TABLE 4

| Surface No. | k | $a_4$ | $a_6$ | $a_8$ | $a_{10}$ | $a_{12}$ |
|---|---|---|---|---|---|---|
| S12 | 28.22 | 0.00169 | −5.5E−06 | 9.682E−07 | 4.12E−08 | 0 |
| S13 | −22.54 | 0.00109 | 7.34E−05 | −2.45E−06 | 9.66E−08 | 0 |

Figure 6:
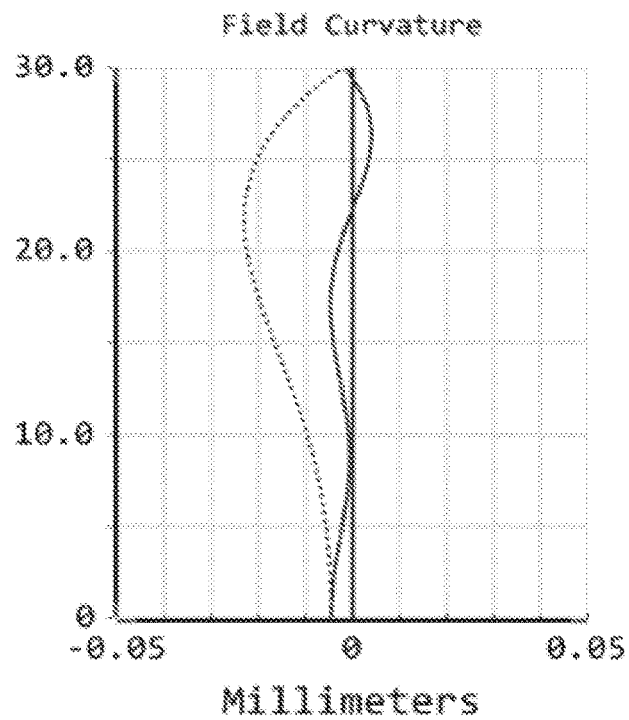
FIG. 6 illustrates a schematic diagram showing field curvature curves of the prime lens module, in accordance with the second embodiment of the present disclosure.
Figure 7:
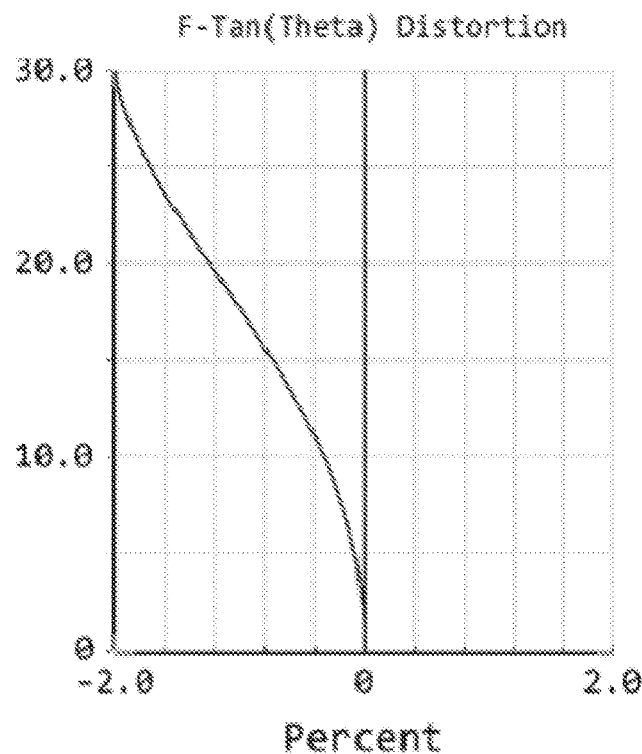
FIG. 7 illustrates a schematic diagram showing distortion curves of the prime lens module, in accordance with the second embodiment of the present disclosure.
Figure 8:
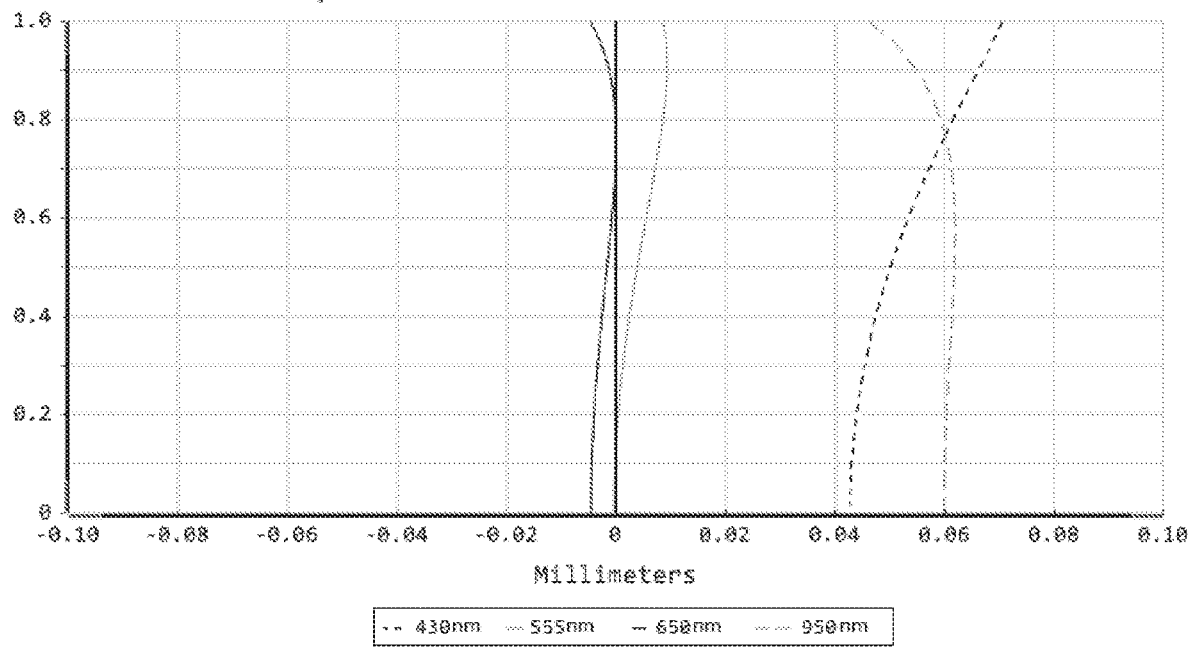
FIG. 8 illustrates a schematic diagram of showing axial aberration curves of the sectional structure of the prime lens module in the first embodiment of the present disclosure.

As illustrated in FIG. 6, FIG. 6 illustrates a schematic diagram showing field curvature curves of the prime lens module, in accordance with the illustrated embodiment. As illustrated in FIG. 7, FIG. 7 illustrates a schematic diagram showing distortion curves of the prime lens module, in accordance with the illustrated embodiment. As illustrated in FIG. 8, FIG. 8 illustrates a schematic diagram of showing axial aberration curves of the sectional structure of the prime lens module, in accordance with the illustrated embodiment. It can be seen from FIGS. 6 to 8 that the field curvature, the distortion, and the axial aberration of the prime lens module 200 are all well corrected.

Embodiment 3

Figure 9:
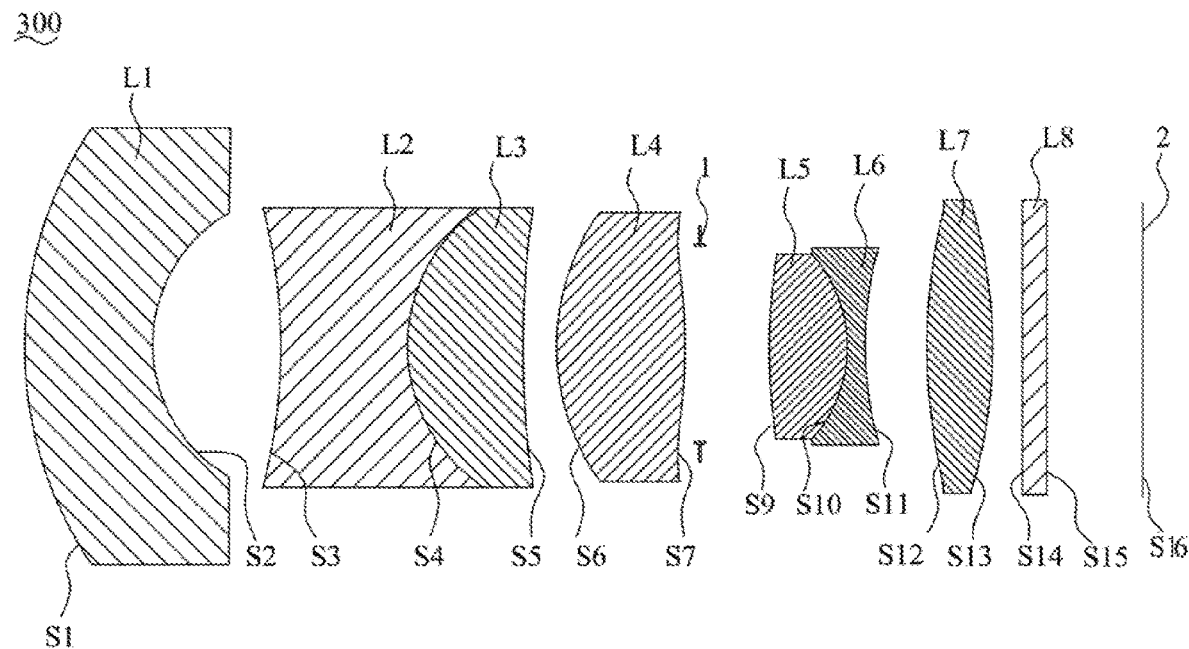
FIG. 9 illustrates a schematic diagram of a schematic cross-sectional view of the prime lens module, in accordance with a third embodiment of the present disclosure.

As illustrated in FIG. 9, a schematic cross-sectional structure diagram of a prime lens module 300 in a third embodiment of the present invention is provided. The prime lens module 300 in this embodiment is substantially identical with the prime lens module 100 in the first embodiment, except for the following differences: the position of the aspheric lens of this embodiment is different from that of the first embodiment. The fourth lens L4 of the prime lens module 300 in this embodiment is an aspheric lens, while in the first embodiment, the seventh lens L7 is aspheric lens. In other words, the fourth lens L4 is a biconvex aspheric lens, and the seventh lens L7 is a biconvex spherical lens. In addition, the third lens L3 is a meniscus spherical lens with a concave surface facing the imaging side surface.

The relevant parameters of each lens of the prime lens module 300 in this embodiment are different from the relevant parameters of each lens of the prime lens module 100 in the first embodiment.

As illustrated in Table 5, the relevant parameters of each lens of the prime lens module 300 in this embodiment are provided.

TABLE 5

| Surface No. | Code | Surface type | Curvature radius (mm) | Thickness (mm) | Refractive index | Abbe number |
|---|---|---|---|---|---|---|
| S1 | L1 | Spherical surface | 12.26 | 3.99 | 1.76 | 52.32 |
| S2 | | Spherical surface | 4.80 | 3.97 | | |
| S3 | L2 | Spherical surface | −17.10 | 4.00 | 1.64 | 35.39 |
| S4 | L3 | Spherical surface | 5.17 | 3.70 | 1.76 | 52.33 |
| S5 | | Spherical surface | 37.41 | 0.95 | | |
| S6 | L4 | Aspheric surface | 7.06 | 4.00 | 1.88 | 37.21 |

TABLE 5-continued

| Surface No. | Code | Surface type | Curvature radius (mm) | Thickness (mm) | Refractive index | Abbe number |
|---|---|---|---|---|---|---|
| S7 | | Aspheric surface | −22.93 | 0.50 | | |
| | Stop | Spherical surface | Infinity | 2.22 | | |
| S9 | L5 | Spherical surface | 18.84 | 2.40 | 1.62 | 60.34 |
| S10 | L6 | Spherical surface | −4.26 | 0.55 | 1.92 | 18.90 |
| S11 | | Spherical surface | 9.35 | 2.01 | | |
| S12 | L7 | Spherical surface | 19.25 | 2.04 | 1.95 | 17.94 |
| S13 | | Spherical surface | −14.92 | 0.97 | | |
| S14 | L8 | Spherical surface | Infinity | 0.70 | 1.52 | 64.21 |
| S15 | | Spherical surface | Infinity | 3.01 | | |
| S16 | Imaging side surface | Spherical surface | Infinity | 0.00 | | |

Refer to Table 6, the relevant parameters of the aspheric surface of the prime lens module 300 in this embodiment are provided.

TABLE 6

| Surface No. | k | $a_4$ | $a_6$ | $a_8$ | $a_{10}$ | $a_{12}$ |
|---|---|---|---|---|---|---|
| S6 | 0.067 | 0.00012 | 1.4E−05 | −7.2E−07 | 4.56E−08 | −6.7E−10 |
| S7 | −200 | 0.00054 | 9.45E−05 | 1.56E−06 | −4.4E−07 | 1.95E−08 |

Figure 10:
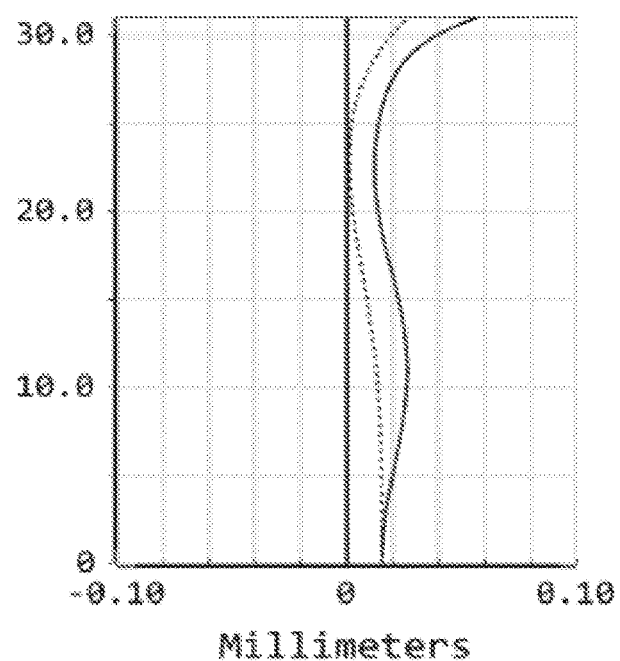
FIG. 10 illustrates a schematic diagram showing field curvature curves of the prime lens module, in accordance with the third embodiment of the present disclosure.
Figure 11:
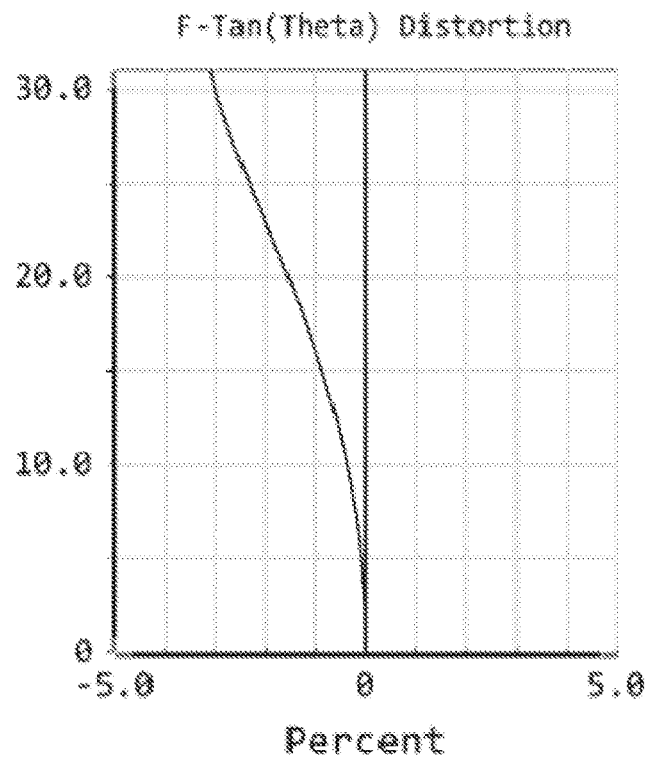
FIG. 11 illustrates a schematic diagram showing distortion curves of the prime lens module, in accordance with the third embodiment of the present disclosure.
Figure 12:
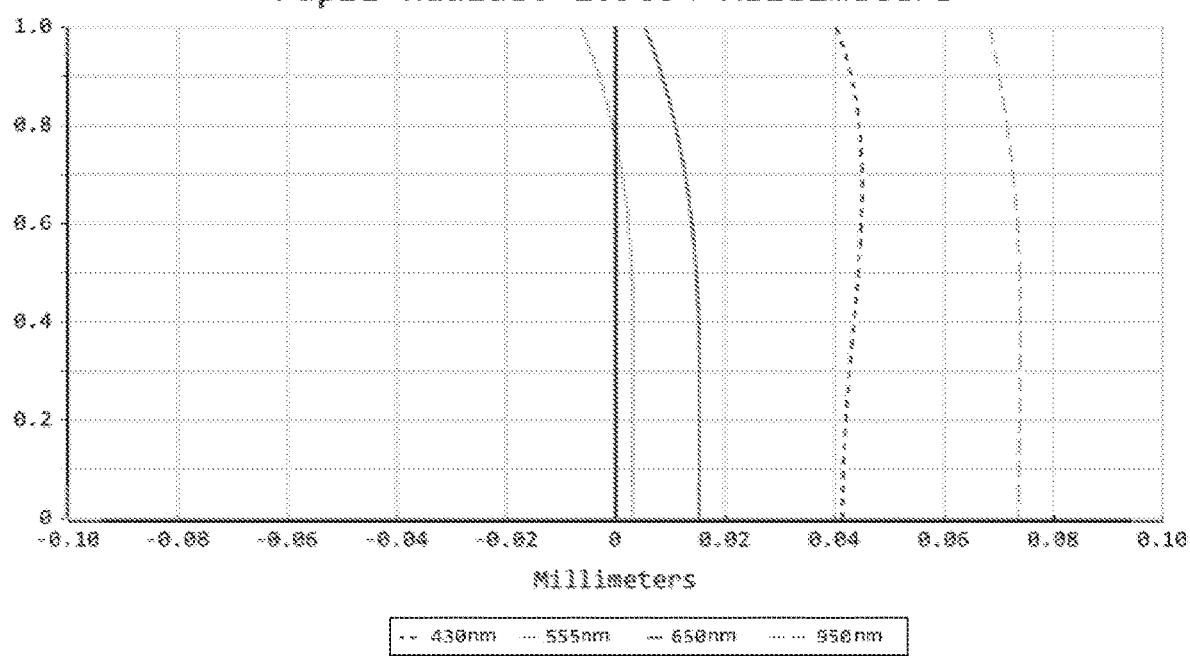
FIG. 12 illustrates a schematic diagram showing axial aberration curves of the prime lens module in the third embodiment of the present disclosure.

As illustrated in FIG. 10, FIG. 10 illustrates a schematic diagram showing field curvature curves of the prime lens module, in accordance with the illustrated embodiment. As illustrated in FIG. 11, FIG. 11 illustrates a schematic diagram showing distortion curves of the prime lens module, in accordance with the illustrated embodiment. As illustrated in FIG. 12, FIG. 12 illustrates a schematic diagram showing axial aberration curves of the prime lens module, in accordance with the illustrated embodiment. It can be seen from FIGS. 10 to 12 that the field curvature, the distortion, and the axial aberration of the prime lens module 300 are all well corrected.

As illustrated in table 7, optical parameters corresponding to each of the above three embodiments are illustrated. The optical parameters include the focal length f of the prime lens module 300, the number of stops F #, the total optical length $T_L$, and the FOV 2θ, and also include calculated value corresponding to the expressions in the above embodiments.

TABLE 7

| Embodiment | f (mm) | F# | $T_L$(mm) | 2θ | $T_L/(f*\tan\theta)$ | $|f_2/f_3|$ | $f_4/f_7$ | $|V_5-V_6|$ |
|---|---|---|---|---|---|---|---|---|
| 1 | 7.861 | 2.8 | 34.95 | 60 | 7.70 | 0.76 | 0.74 | 55 |
| 2 | 7.781 | 2.8 | 30.00 | 60 | 6.68 | 0.85 | 0.69 | 55.89 |
| 3 | 7.861 | 2.8 | 35 | 60 | 7.71 | 0.77 | 0.72 | 41.44 |

Figure 13:
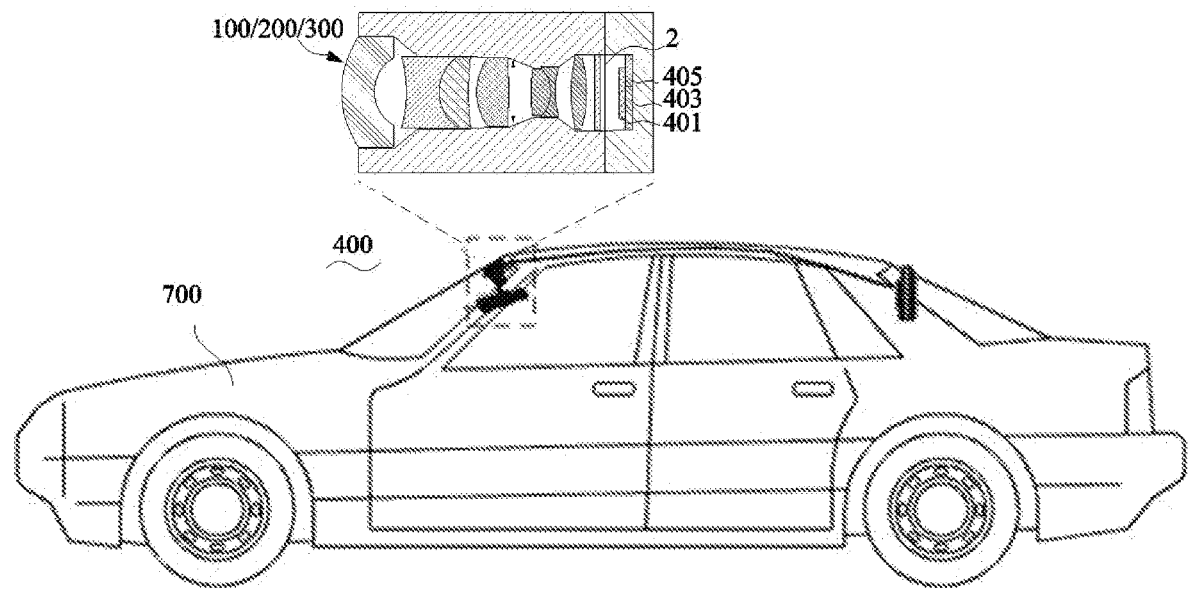
FIG. 13 illustrates a schematic view of an in-vehicle camera system according to one embodiment of the present disclosure.

As illustrated in FIG. 13, an in-vehicle camera system 400 is provided, in accordance with an embodiment of the present disclosure. The in-vehicle camera system 400 includes a prime lens module. The prime lens module may be any of the aforementioned prime lens modules (100/200/300). For example, the prime lens module 100/200/300 is installed in a vehicle to obtain traffic information and road conditions information.

The in-vehicle camera system 400 may further include an image sensor 401, a memory 403, and a processor 405. The image sensor 401 is disposed at an imaging side of the prime lens module 100/200/300. For example, the image sensor 401 may face the imaging side surface 2 of the prime lens module 100/200/300. The image sensor 401 is configured to generate images basing on lights captured by the prime lens module 100/200/300. The processor 405 is configured to process the data such as image data and audio data obtained by the image sensor 401. The memory 403 is configured to store the data obtained by the image sensor 401.

In some embodiments, the in-vehicle camera system 400 may be a driving recorder. The drive recorder may be installed in a vehicle 700. The drive recorder is used for acquiring driving data such as images and sounds during driving. Optionally, the drive recorder further includes a display screen for displaying the acquired driving data in real time. The display screen may be a touch display screen. The drive recorder is further configured to receive and respond to touch operations acting on the touch display screen.

In some embodiments, the in-vehicle camera system 400 may be a driver assistant system. There may be multiple sensors in the driver assistant system. The processor of the driver assistant system is configured to process the data such as image data and audio data obtained by the sensors. It is in particular to be noted that the term "sensors" according to the present invention also comprises virtual sensors. Such virtual sensor may be for example a GPS which is able to determine a current absolute position of the vehicle in spatial coordinates. Such spatial coordinates are then considered to represent a sensor output of a GPS sensor. Also a map database is considered to be such virtual sensor, because digital maps allow easy access to important data like geometrical road configuration, number and width of lanes as well as incoming or outgoing road segments of an intersection. The sensor results of the sensors are transmitted to the processor. The processor is configured to extract situation features (or descriptors) from the sensor results. Such feature extraction per se is already known from other prior art systems and thus the details thereof are not explained repeatedly. The processor is further configured to generate driving information according to the sensor results, and vehicle operation controls may be actuated by the driver assistant system 200. The driver assistant system may be further applied in an automated driving vehicle.

Figure 14:
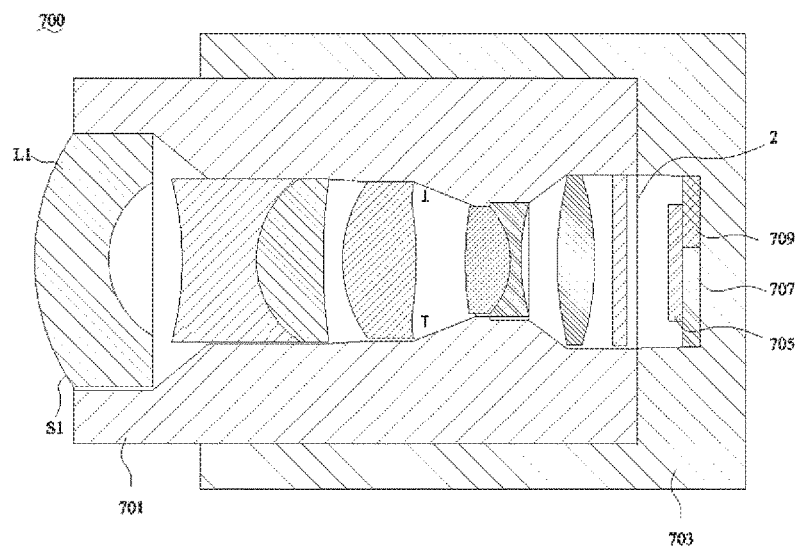
FIG. 14 illustrates a schematic view of a camera module, in accordance to one embodiment of the present disclosure.

As illustrated in FIG. 14, the present disclosure further provides a camera module 700. The camera module 700 includes the prime lens module 100/200/300 of any one of the embodiments described above, a casing 701, a barrel 703, and an image sensor 705. The casing 701 is connected to the barrel 703, the prime lens module 100/200/300 is disposed in the barrel 701, and the image sensor 705 is disposed in the casing 701. The image sensor 705 is disposed at an imaging side of the prime lens module 100/200/300. For example, the image sensor 705 may face the imaging side surface 2 of the prime lens module 100/200/300. The image sensor 705 is configured to generate images basing on lights captured by the prime lens module 100/200/300.

The camera module 700 may further include a memory 707, and a processor 709. The processor 709 is configured to process the data such as image data and audio data obtained by the image sensor 705. The memory 707 is configured to store the data obtained by the image sensor 705.

In summary, in the above embodiments of the present invention, the prime lens module, the in-vehicle camera system including the prime lens module, the camera module, and the in-vehicle camera system have the following advantages:

1. The prime lens module provided by this embodiment is small in size and light in weight, and a processing accuracy of the prime lens module maintains at a low level. Two sets of glue-bonded lenses are applied, which makes it is easy to assemble the prime lens module, and effectively reduces tolerance loss. A high-quality resolution is achieved, that is, an ability of resolving original details of a subject in the captured image is improved;
2. An aspherical lens is used as the last lens of the prime lens module provided in this embodiment. The lager the distance between the aspherical lens and the stop 1, the more beneficial for the distortion correction, which can minimize the distortion of the prime lens module;
3. The lenses of the prime lens module provided in this embodiment may be all made of glass, which can adapt to different temperature environments, and is in good temperature control. A service life of the prime lens module is lengthened, and stability of the prime lens module is improved;
4. A lens with great dispersion and a lens with small dispersion are bonded together via optical glue and cooperatively form a glue-bonded lens group in the prime lens module in the embodiments of present disclosure. The fifth lens L5 is provided with a positive focal power and with a large Abbe number to generate a small positive chromatic aberration. The sixth lens L6 is provided with a negative focal power, and with a small Abbe number to generate a large negative chromatic aberration. In other words, in a glue-bonded lens group, the positive lens (the fifth lens L5) of the glue-bonded lens group, which is closed to the stop 1, is made of small dispersion materials, and a negative lens (the sixth lens L6) of the glue-bonded lens group is made of great dispersion material. By this way, an overall aberration of the glue-bonded lens group can be effectively reduced, and a purple fringing can be minimized. In other words, it can better avoid generating color spots at a boundary of a highlights area and a shadows area when capturing an object with a large contrast.
5. The prime lens module provided in this embodiment can achieve more than 8 million pixels in a visible light environment or infrared light environment, which has a higher imaging quality than the 5 million pixels or less in the prior art.
6. The prime lens module provided in this embodiment has an image surface size of φ8.8 mm, which can be matched with a chip in size of ½-inch. For example, the prime lens module may suitable for a ½-inch chip with a size of 7.7 mm*4.4 mm*8.8 mm. Compared with the existing matching chips that are generally ⅓ inches or ¼ inches in size, being suitable for a smaller chip lens with the same number of pixels, the prime lens module provided in this embodiment can achieve a better imaging quality, and meet the needs of high-definition vehicle lens;
7. All lenses of the prime lens module of the present invention can be coated with high-transmittance multilayer films, and the transmittance of each of the lenses can greater than or equal to 99.5%, so that an ultra-high transmittance of the prime lens module is greater than that of prior art.

The above embodiments are only preferred embodiments of the present disclosure and are not used to limit the present disclosure. For those skilled in the art, the present disclosure can have various modifications and changes. Any modification, equivalent replacement, improvement, etc., made within the spirit and principle of the present disclosure shall be included in the protection scope of the present invention. It should be noted that similar reference numerals and letters indicate similar items in the following drawings. Therefore, once an item is defined in one drawing, it does not need to be further defined and explained in the subsequent drawings.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed:

1. A prime lens module, from an object side to an imaging side thereof, the prime lens module sequentially comprising:
a first lens with a negative focal power, the first lens being a meniscus spherical lens with a concave surface facing the imaging side;
a second lens with a negative focal power, the second lens being a biconcave spherical lens;
a third lens with a positive focal power, the third lens being a biconvex spherical lens or a meniscus spherical lens;
a fourth lens with a positive focal power, the fourth lens being a biconvex spherical lens or a biconvex aspheric lens;
a fifth lens with a positive focal power, the fifth lens being a biconvex spherical lens;
a sixth lens with a negative focal power, the sixth lens being a biconcave spherical lens; and a seventh lens with a positive focal power, the seventh lens being selected from a group consisting of a biconvex aspheric lens, a biconvex spherical lens, and a meniscus aspheric lens;

wherein the second lens and the third lens are bonded together through optical glue; the fifth lens and the sixth lens are bonded through optical glue; one of the fourth lens and the seventh lens is a spherical lens while the other is an aspheric lens, and the prime lens module satisfies the following expression:

$$6.5 < T_L/(f*\tan\theta) < 7.9;$$

where $T_L$ represents an optical total length of the prime lens module;

f represents a focal length of the prime lens module; and

θ represents a half of FOV of the prime lens module.

2. The prime lens module as claimed in claim 1, wherein the prime lens module satisfies the following expression:

$$0.7 < |f_2/f_3| < 0.9;$$

where $f_2$ represents a focal length of the second lens; and $f_3$ represents a focal length of the third lens.

3. The prime lens module as claimed in claim 1, wherein the prime lens module satisfies the following expressions:

$$40 < |V_5 - V_6| < 60;$$

where $V_5$ represents an Abbe number of the fifth lens; and $V_6$ represents an Abbe number of the sixth lens.

4. The prime lens module as claimed in claim 1, wherein the prime lens module satisfies the following expression:

$$0.6 < f_4/f_7 < 0.8;$$

where $f_4$ represents a focal length of the fourth lens; and $f_7$ represents a focal length of the seventh lens.

5. The prime lens module as claimed in claim 1, further comprising a stop; wherein the stop is disposed between the fourth lens and the fifth lens or between the third lens and the fourth lens.

6. The prime lens module as claimed in claim 1, wherein the fourth lens is a biconvex spherical lens, and the seventh lens is a biconvex aspheric lens.

7. The prime lens module as claimed in claim 1, wherein the shape of aspheric surface of each aspheric lens in the prime lens module satisfies the following expression:

$$z = \frac{ch^2}{1 + \sqrt{1-(1+k)c^2h^2}} + a_4h^4 + a_6h^6 + a_8h^8 + a_{10}h^{10} + a_{12}h^{12};$$

where z represents a vector height between a point on the surface and a vertex of the surface along an optical axis of the prime lens module;

h represents a distance between the point on the surface and the optical axis;

c represents a curvature of the vertex of the surface;

k represents a conic coefficient;

$a_4$ represents a fourth order surface coefficient;

$a_6$ represents a sixth order surface coefficient;

$a_8$ represents an eighth order surface coefficient;

$a_{10}$ represents a tenth order surface coefficient; and $a_{12}$ represents a twelfth order surface coefficient.

8. The prime lens module as claimed in claim 1, wherein the first lens, the second lens, the third lens, the fourth lens, the fifth lens, the sixth lens, and the seventh lens are all made of glass materials.

9. An in-vehicle camera system, comprising a processor, a memory, an image sensor, and a prime lens module; from an object side to an imaging side thereof, the prime lens module comprising:

a first lens having a negative focal power and a concave imaging side surface, the first lens being a meniscus spherical lens;

a second lens having a negative focal power and two concave spherical surfaces;

a third lens having a positive focal power and two convex spherical surfaces;

a fourth lens having a positive focal power, the fourth lens being a biconvex spherical lens or a biconvex aspheric lens;

a fifth lens having a positive focal power and two convex spherical surfaces;

a sixth lens having a negative focal power and two concave spherical surfaces; and a seventh lens having a positive focal power, the seventh lens being a biconvex aspheric lens or a biconvex spherical lens;

wherein the second lens and the third lens are bonded together through optical glue; the fifth lens and the sixth lens are bonded through optical glue; one of the fourth lens and the seventh lens is a spherical lens while the other is an aspheric lens, and the prime lens module satisfies the following expressions:

$$40 < |V_5 - V_6| < 60;$$

where $V_5$ represents an Abbe number of the fifth lens; and $V_6$ represents an Abbe number of the sixth lens.

10. The in-vehicle camera system as claimed in claim 9, wherein the prime lens module satisfies the following expression:

$$0.7 < |f_2/f_3| < 0.9;$$

where $f_2$ represents a focal length of the second lens; and $f_3$ represents a focal length of the third lens.

11. The in-vehicle camera system as claimed in claim 9, wherein the prime lens module satisfies the following expression:

$$0.6 < f_4/f_7 < 0.8;$$

where $f_4$ represents a focal length of the fourth lens; and $f_7$ represents a focal length of the seventh lens.

12. The in-vehicle camera system as claimed in claim 9, wherein the prime lens module further comprises a stop; wherein the stop is disposed between the fourth lens and the fifth lens or between the third lens and the fourth lens.

13. The in-vehicle camera system as claimed in claim 9, wherein the fourth lens is a biconvex spherical lens, and the seventh lens is a biconvex aspheric lens.

14. The in-vehicle camera system as claimed in claim 9, wherein the fourth lens is a biconvex aspheric lens, and the seventh lens is a biconvex spherical lens.

15. The in-vehicle camera system as claimed in claim 9, wherein the fourth lens is a biconvex spherical lens, and the seventh lens is a meniscus aspheric lens with a concave surface facing the object side.

16. The in-vehicle camera system as claimed in claim 9, wherein the first lens, the second lens, the third lens, the fourth lens, the fifth lens, the sixth lens, and the seventh lens are all made of glass materials.

17. A camera module, comprising a casing, a barrel connected to the casing, and a prime lens module disposed in the barrel; wherein from an object side to an imaging side thereof, the prime lens module comprises:

a first lens having a negative focal power and a concave surface facing the imaging side;

a second lens having a negative focal power and two concave spherical surfaces;

a third lens having a positive focal power, the third lens being a biconvex spherical lens or a meniscus spherical lens;

a fourth lens having a positive focal power, the fourth lens being a biconvex spherical lens or a biconvex aspheric lens;

a fifth lens having a positive focal power and two convex spherical surfaces;

a sixth lens having a negative focal power and two concave spherical surfaces; and a seventh lens having a positive focal power, the seventh lens being selected from a group consisting of a biconvex aspheric lens, a biconvex spherical lens, and a meniscus aspheric lens;

wherein the second lens and the third lens are bonded together through optical glue; the fifth lens and the sixth lens are bonded through optical glue; one of the fourth lens and the seventh lens is a spherical lens while the other is an aspheric lens; wherein the prime lens module satisfies the following expression:

$$0.7 < |f_2/f_3| < 0.9;$$

where $f_2$ represents a focal length of the second lens; and $f_3$ represents a focal length of the third lens;

wherein the fourth lens is a biconvex spherical lens, and the seventh lens is a meniscus aspheric lens with a concave surface facing the object side.

18. The camera module as claimed in claim 17, wherein the prime lens module satisfies the following expression:

$$0.6 < f_4/f_7 < 0.8;$$

where $f_4$ represents a focal length of the fourth lens; and $f_7$ represents a focal length of the seventh lens.

* * * * *